Dec. 10, 1946. T. O. SUMMERS, JR 2,412,481
FRICTION-ACTUATED ERECTING MECHANISM
Filed Oct. 22, 1942    2 Sheets-Sheet 1

INVENTOR.
THOMAS O. SUMMERS JR.
BY
Stuart M. Maule
ATTORNEY.

INVENTOR.
THOMAS O. SUMMERS JR.
BY
ATTORNEY.

Patented Dec. 10, 1946

2,412,481

UNITED STATES PATENT OFFICE 2,412,481

FRICTION-ACTUATED ERECTING MECHANISM

Thomas O. Summers, Jr., Los Angeles, Calif.

Application October 22, 1942, Serial No. 462,943

14 Claims. (Cl. 74—5)

This invention relates to gyro-verticals.

An object of the invention is to provide an erecting mechanism which is particularly adapted for, but not necessarily limited to, use in conjunction with an electrically driven gyroscope for the reason that instead of placing dependence upon the reactive forces of air jets for the development of erecting torque, as is conventionally done in the case of air driven gyro-verticals, it is motivated by forces derived from the gyroscope's rotor and applied to the gyroscope in the form of an erecting torque through the agency of mechanical drag such as friction.

A more detailed object in this connection is to provide a gyroscope erecting mechanism which takes the form of a moving element or rotor which turns at constant predetermined rate, and the rotation of which is resisted by an element which is stationary, at least insofar as the rotary motion of the rotor is concerned, and thereby develop a dragging force exerted against a suitable portion of the gyroscope offset from the axes of its support, and in a direction substantially perpendicular to the precedent displacement thereof, so as to cause the gyroscope immediately to erect itself back to its initial, predetermined position.

A further object is to provide a drag-actuated erecting mechanism, comprising cooperatively associated rotor and stator elements as described, wherein the stator element is arranged to conform to whatever movements of the gyroscope may eventuate, within reasonable limits, and in such a manner as to offer negligible, if any, resistance to the freedom of movement of the gyroscope.

A further object is to provide drag-developing stator elements for an erecting mechanism of the general character indicated, which are actuated by the force of gravity, and which, therefore, are substantially uniform and fully dependable in their operation.

A still further object is to provide an erecting mechanism as described, in the design of which particular attention has been paid to compact arrangement, so as to reduce the over-all dimensions of the assembled instrument, and lightness, for the reason that this type of instrument is designed primarily for use as an aid to the navigation of aircraft.

Another object of my present invention is to provide a caging device for a gyroscopic instrument of unusually efficient, compact, and simple design, and of such a nature that it affords the utmost convenience to the operator in affecting positive and dependable caging of the instrument.

A further object in this connection, is to provide a caging instrument for a gyroscopic device of the general character indicated, designed to operate upon the principle of bringing an erecting force to bear upon the gyroscope in such direction that the gyroscope actually erects itself to that position in which a detent enters a suitable socket and thereby locks the gyroscope in caged position.

The invention possesses other objects and valuable features, some of which, with those enumerated, will be set forth in the following description of the preferred embodiment of my invention, illustrated in the drawings accompanying and forming part of the specification. It is to be understood that I do not limit myself to the showing made by the said drawings and description, as I may adopt variations of the preferred embodiment within the scope of my invention as defined by the claims.

Referring to the drawings.

Figure 1:
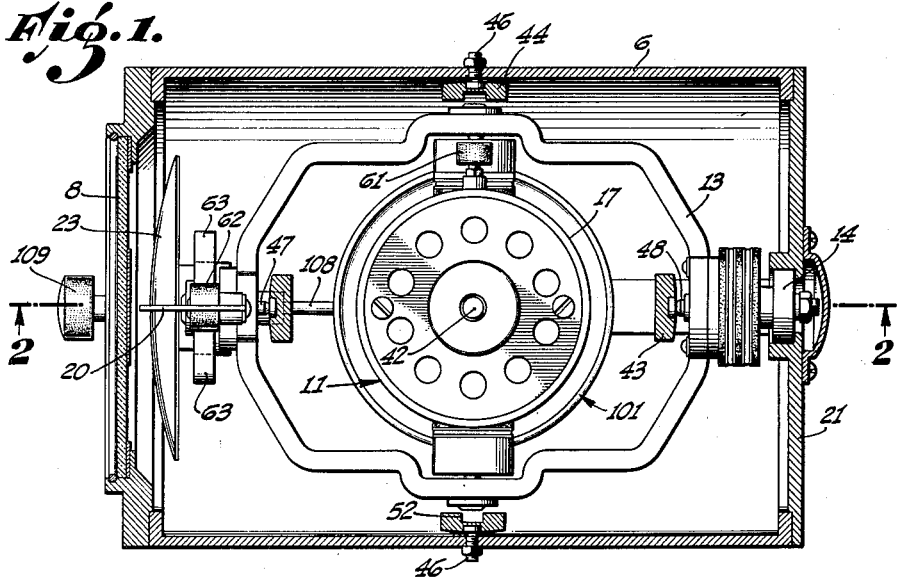
Figure 1 is a horizontal, medial, sectional view taken through a gyroscopic instrument embodying the principles of the present invention.
Figure 2:
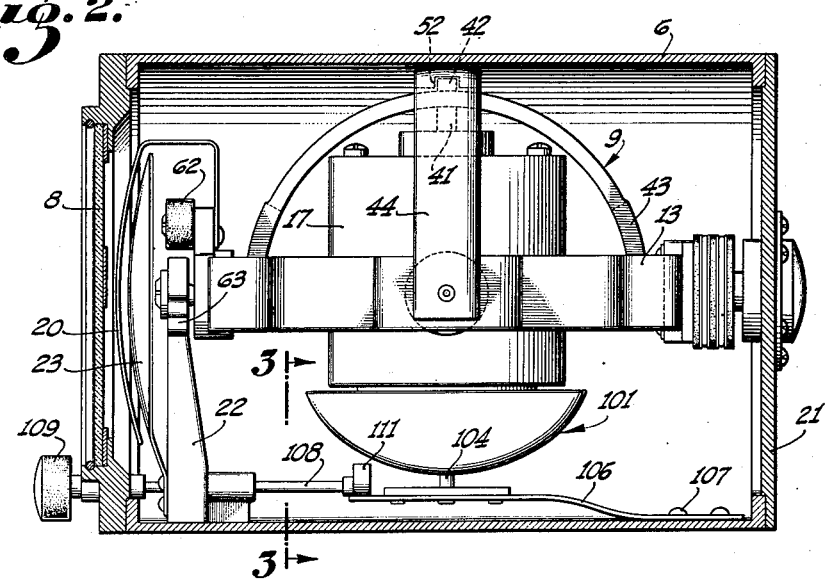
Figure 2 is a view in side elevation of the internal, operative mechanism of the instrument of Figure 1, the housing of the instrument being shown in longitudinal, medial, vertical section taken upon the line 2—2 of Figure 1, with the direction of view as indicated.

That embodiment of my present invention, which has been chosen for illustration and description, is encased within a housing 6 of suitable size and configuration to adapt it for mounting upon the instrument panel of an aircraft, and having a lens or window 8 in the exposed end of the housing 6. Mounted within the housing 6 is a gyro-vertical construction indicated in its entirety at 9. This gyro-vertical 9 comprises a gyroscope 11, supported for freedom of movement about mutually perpendicular horizontal axes, and in substantial neutral equilibrium through the expedient of a gimbal construction 13, supported as by axially aligned bearings 14 and 16 for oscillation about a horizontal, longitudinal, major axis. The rotor bearing casing 17, within which the rotor 12 is journaled, as by means of axially aligned bearings 18, the axis of which is normally vertical, is supported in the gimbal 13 for oscillation about a horizontal axis, which is perpendicular to that of the bearings 14 and 16, as by axially aligned bearings 19. The after bearing 14 for the gimbal ring 13 is supported by the after wall 21 of the housing 6; but since the front wall of the housing 6 contains the window 8, it is preferable to support the forward bearing 16 by means of a post 22, rigid with the housing 6 and extending radially inwards therefrom, and in such position within the housing 6, with respect to its longitudinal dimensions, that a space is left between the post 22 and the window to accommodate the indicating media and a suitable background shield 23, which conceals the operating mechanism of the instrument from view. It might here be explained that inasmuch as the gyro-vertical mechanism of the present invention is applicable with equal efficacy to several different types of indicators, the indicating media 20 chosen for illustration are more or less diagrammatic, and are shown in an exemplary, and not a limiting sense.

The gyroscope 11 is of the electrically driven type, hence the rotor 12 thereof includes a core 31 supporting windings 32 of suitable design which are cooperatively associated with stator windings 33, so that when energized, the rotor 12 is caused to spin at suitable speed. Means are provided for conducting energizing current to the motor 34, of which the described rotor and stator windings, 32 and 33 respectively, are essential parts; but inasmuch as the details of this means for energizing the motor form no portion of the present invention, no need arises for description or illustration of the energizing circuit in the present application.

Means are provided for erecting the gyroscope, i. e., for causing it automatically to maintain a predetermined attitude, preferably with the axis of spin of the rotor 12 vertical. Being electrically driven, there is no flow of air associated with the instrument of sufficient magnitude to permit the erection of the device to be operated by the reactive forces of air jets. Instead, the erecting mechanism depends for its operation upon forces derived from a suitable drag; in the present modification, from mechanical friction, with the result that I have so designed the mechanism that it includes cooperatively associated rotor and stator elements adapted to be brought into frictional engagement with each other whenever the gyroscope wanders from its normal position. One of these elements, preferably the rotor element, is carried by the freely suspended gyroscope, and the other, i. e., the stator, is carried by the structure which supports the gyroscope, with the result that the side thrust developed as a result of the frictional interengagement between the rotor and stator applies a torque to the freely suspended gyroscope in such a manner and in such direction that the torque acts as an erecting torque, causing the gyroscope immediately to precess itself back to its normal position by the application of forces derived from the gyroscope's rotor, in accordance with the well-known principles of gyroscopic action.

A convenient and exceedingly effective manner of providing the rotor element of this structure is by extending the shaft 41, by which the rotor 12 is journaled, so that one end, preferably its upper end 42, protrudes from the top of the rotor bearing casing 17, thus providing a spinning and vertically extending pin of cylindrical form, which is disposed in convenient location directly above the intersection of the major and minor axes of the gyroscope, to serve as the rotor element of the erecting mechanism.

Figure 4:
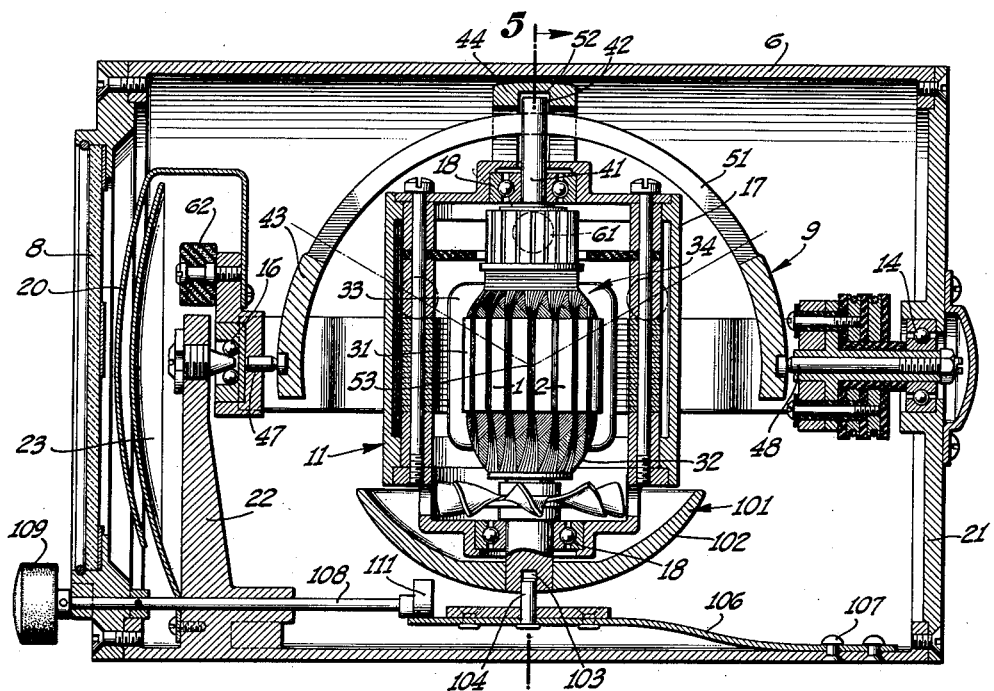
Figure 4 is a longitudinal, medial, vertical sectional view of both the housing and the operative mechanism therein.
Figure 5:
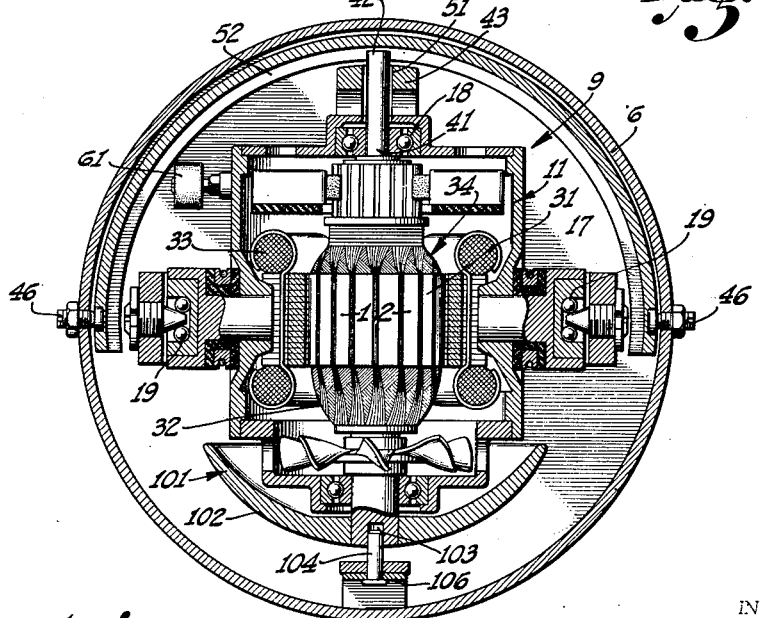
Figure 5 is a transverse, vertical, sectional view taken upon the line 5—5 of Figure 4 with the direction of view as indicated.

In order to provide a suitable mass against which the rotor 42 may engage, and thereby develop by friction the lateral thrust necessary to produce the desired erecting torque, and, further, so to design and correlate the mass with the rotor that it functions regardless of the direction which the wandering of the gyroscope may take, I have designed the mass in the form of a plurality, preferably a pair of crossed, substantially semicircular stators 43 and 44 mounted for oscillation about mutually perpendicular axes, and preferably for oscillation about the major and minor gimbal axes, respectively. This arrangement is merely a matter of convenience, inasmuch as the erecting mechanism would also operate were the stator masses 43 and 44 mounted for oscillation about other mutually perpendicular axes, as, for example, each of the stators could very conveniently be mounted to oscillate about an axis either higher or lower than as illustrated. The two masses are mounted for oscillation independently of each other and each about an axis which is perpendicular to a vertical plane which includes one or the other of the gimbal axes. In the described modification, the outer stator mass is journaled upon a pair of pins 46, carried by the housing 6 of the instrument, which are axially aligned with each other and with the minor gimbal bearings 19 when the gimbal 13 is disposed horizontally. This stator mass 44 is of semicircular form, and extends upwards from one pin 46 in an arcuate path closely adjacent the inner surface of the housing 6, and closely adjacent the upper end of the rotor 41, and thence downwardly in a continuation of the same arcuate path to its point of attachment to the other pin 46, as clearly shown in Figure 5. The inner stator mass 43 is of similar form, but of slightly less diameter so that it can move independently of the outer stator 44. The inner stator 43 is carried by a pair of axially aligned pins 47 and 48 which are carried by the gimbal ring 13 in axial alignment with the bearings 14 and 16 by which the ring 13 is journaled. In order that the rotor 42 of the erecting mechanism may engage both of the stator masses 43 and 44, it extends through a longitudinally extending slot 51 in the inner stator mass 43 and therebeyond into a slot 52 in the under surface of the other stator mass 44, as best shown in Figures 4 and 5. The parts are so proportioned and arranged that the centers of the arcs described by both stators 43 and 44 lie in the point (indicated at 53) of intersection of the major and minor gimbal axes with the result that if relative rotary motion of the gyroscope about either or both of the gimbal axes occurs, the alignment of the rotor 42 with the stators 43 and 44 will not be altered. For example, when the gyroscope 11 is accurately vertical, and the airplane carrying the instrument goes into a dive, rotary motion of the housing 6 about the transverse gimbal axis will occur, causing the stator 43 also to turn about this minor gimbal axis, moving longitudinally past the rotor 42, the axis of which remains stationary due to the stabilizing effect of the gyroscope, with the result that should any deviation of the gyroscope about the major axis occur, while the described displacement of the housing 6 obtains, thus producing lateral movement of the rotor 42, it will bear against the longitudinally extending inner stator 43 in precisely the same manner as though the ship were in level flight, but at a different point in the length of the stator from the center thereof, with which the rotor 42 is in alignment when the instrument is perfectly horizontal.

Since both stators 43 and 44 extend upwards from their respective journal supports, they are in unstable equilibrium. Consequently, whenever any wandering of the gyroscope 11 occurs, removing the axis of rotation of the shaft 41 from its normally vertical position, either or both of the stators 43 and 44 will be carried in that same direction in rotary motion about their respective axes, by the engagement of the rotor 42 therewith, whereupon gravity will press the upper side of the slot of whichever stator is thus moved against the side of the rotor 42 which trails during that displacement. This engagement between the stator and the rotating upper end 42 of the shaft 41 will develop friction, thereby generating a force which is exerted by the stationary mass 43 or 44, or both, as the case might be, against the rotor 42, which, it should be remembered, is a portion of the freely suspended body. That force, or the resultant which constitutes the combination of forces in the event that both stators 43 and 44 are acting simultaneously, will be exerted tangentially against the rotor 42 and therefore in a direction perpendicular to the precedent displacement of the gyroscope. It is a well-known principle of gyroscopic action that if an erecting torque is exerted against a gyroscope, the gyroscope will immediately precess in a direction perpendicular to the direction in which the erecting torque is exerted. Consequently, if the gyroscope rotor 12 is spinning in a clockwise direction as viewed in Figure 1, and if the gyroscope wanders in a clockwise direction as viewed in Figure 5, the longitudinally extending stator 43 also swings to the right as viewed in Figure 5, causing the trailing edge of the slot 51 therein to bear against the rotor 41, thereby developing a frictional thrust exerted by the stator 43 against the rotor 42 in a direction perpendicular to the direction in which the stator has been displaced from the vertical, and to the left as viewed upon Figure 4. This will cause the gyroscope to precess, swinging it back about the horizontal major gimbal axis in counter clockwise direction as viewed in Figure 5, thereby returning the gyroscope to that position in which the axis of its shaft 41 is substantially vertical, at which time the pressure of the mass 43 against the rotor will cease, and the erecting precession, consequently, terminate. As will be well understood, the action of the outer stator 44 is exactly the same when displacement of the gyroscope occurs about the transverse or minor axis; and when the displacement of the gyroscope constitutes a movement thereof about both gimbal axes, then both stators 43 and 44 will be brought into play simultaneously, resulting in a return precessional movement of the gyroscope to correct for the displacement thereof which has immediately preceded.

Since the slot 52 extends through substantially 180° measured angularly about the center of the arc described by the associated stator 44, it is apparent that a ship carrying one of these instruments can bank at substantially 90° to either side of the vertical, without developing interference between the rotor 42 and either end of the slot 52. In the case of the stator 43, its slot 51 is of sufficient length to make ample provision for pitching at as great an angle as 60° on each side of the vertical. It should be explained, however, that the length of the slots 51 and 52 is subject to variation, and therefore, that the extent of deviation of the ship from level flight which can be experienced without interference with efficient operation of the instrument is likewise subject to variation. Means are provided for preventing the rotor 42 from coming into engagement of either end of either slot in the event that the ship carrying the instrument should vary its attitude more than the extent for which the instrument has been designed. The rotor bearing casing 17 carries a preferably cushioned stop 61 in such position that it will engage the gimbal ring 13 just before the rotor 42 reaches that position in which it could engage either end of the slot 51; and similarly, the gimbal ring 13 carries a preferably cushioned stop 62 in position to impinge against protruding lugs 63 rigid with the post 22, when the casing 6 rotates about the major axis of the gyroscope slightly less than the angular distance required for the rotor 42 to reach the ends of the slot 52.

Figure 3:
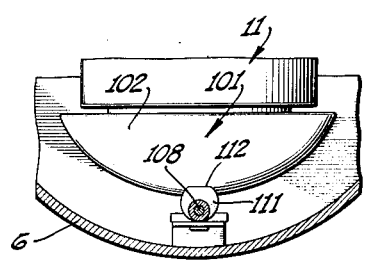
Figure 3 is a detail view in transverse, vertical section taken upon the line 3—3 of Figure 2, with the direction of view indicated by the arrows, to show the control for the caging device.

The caging device, which is indicated in its entirety at 101, which has been incorporated with the gyro-vertical of the present invention, also is actuated by friction between a rotating element carried by the rotor of the gyroscope and a friction element or stator carried by the housing 6 with respect to which the rotor spins. The principle of operation of this caging device is the same as that of the erecting mechanism hereinabove described, inasmuch as alignment of the parts necessary for caging is attained by erecting the gyroscope to proper position, and the force which is applied to the gyroscope so as to cause it to erect itself in that manner, is derived from the rotor 12, and controlled by a drag imposed by a stator element upon a rotary element carried by the shaft of the gyroscope rotor. Moreover, the caging device is designed so that it will function regardless of the position of the gyroscope within the casing 6, and cause the gyroscope to erect itself so that position in which the caging device can become effective. Toward this end, the rotor of the caging device, which is indicated at 102, comprises a dome-shaped head, the outer surface of which substantially has the form of a spherical zone of one base, referred to herein for convenience as a spherical arc. The center of the spherical surface described by the outer face of the head 102 lies at the intersection 53 of the major and minor gimbal axes; and the head 102 also is provided with a socket in the form of a cylindrical recess 103 disposed co-axially with respect to the shaft 41 of the rotor 12 of the gyroscope. The stator element is a pin 104 substantially complementary in form to the recess 103 and carried by a resilient arm, such as a leaf spring 106, one end of which is attached as by rivets 107 to the inside of the housing 6. Associated with the spring 106 is a control rod 108 journaled in the base of the post 22 and extending through the front wall of the housing 6 so that a knob 109 carried thereby is accessible to the pilot to facilitate turning the rod 108. The inner end of the rod 108 carries an eccentric cam 111, which is provided at its portion of greatest diameter with a flat 112 (see Figure 3). The cam 111 is disposed above the free end of the spring 106, the inherent resilience of which presses its free end upwards into engagement with the cam 111. Hence, when the cam 111 is turned to bring its portion of greatest diameter against the spring 106, the spring will be deflected downwards, so lowering the pin 104 that is clear of the head 102. When in this position, the cam 111 presents the flat 112 thereof to the spring, and the spring pressing upwards thereagainst will serve to retain the cam 111 against inadvertent displacement from its then position. The operator can, however, simply by turning the knob 109, turn the cam 111 so as to bring the portion of least diameter into alignment with the spring 106, so as to permit the spring 106 to press the pin 104 upwards so that it will, in the event that the recess 103 is in registry therewith, enter that recess and firmly lock the gyroscope against rotation about either of the gimbal axes, or "cage" the gyroscope. However, in the event that the gyroscope is displaced from that position in which the recess 103 registers with the pin 104 when the spring 106 is released, the upper end of the pin will engage the curved surface of the head 102, thereby developing friction between the spinning head 102 and the stationary pin 104. The point of engagement between the pin and the head will, of course, lie in a radius of the head which extends in the direction of displacement of the recess 103. The friction developed by engagement of the pin against the rotating head will exert a force against the head in a direction perpendicular to that displacement, and, since that force is offset from the axes of the gimbal support of the gyroscope, it will manifest itself as an erecting torque perpendicular to the displacement which has preceded the engagement of the pin with the head. Consequently, the gyroscope immediately will be caused to precess in that direction which will bring the recess 103 into registry with the pin 104, whereupon the spring 106 will press the pin into the recess, thus effectively caging the entire structure which is carried by the gimbal bearings.

As stated, the configuration of the outer surface of the head 102 is that of a spherical arc. Preferably, however, the head is relieved adjacent its peripheral edge so that the radius of curvature at this portion of the head is materially less, the purpose being so to reduce the diameter of the head at and adjacent its extreme edge that should the gyroscope become displaced so far about either or both of the gimbal axes that the pin 104 no longer registers with any portion of the head 102, and the spring 106 then be released permitting the pin 104 to move upwards to its extreme upper position, the head 102 will, upon return of the gyroscope toward its erect position, move over the pin 104 until at least the extreme edge of the head 102 has passed over the pin, whereupon the portion of the head of gradually increasing radius will, as return motion of the gyroscope progresses, be engaged by the pin 104, thus developing the friction which generates an erecting torque as described, the result of which is to cause return of the gyroscope to that position in which the pin 104 and socket 103 are in alignment, and the spring 106 is enabled to urge the pin 104 into the socket.

An important consideration in connection with the caging device 101 is that the head 102 thereof contributes to the successful and dependable operation of the erecting mechanism. When the gyroscope is disposed in its normal position, i. e., with the axis of spin of the rotor substantially vertical, the stators 43 and 44 will exert substantially no pressure against the rotor 42. However, when the gyroscope assumes a position wherein the spinning axis is inclined, one or both of the stators will press with a portion of their weight against the rotor, thereby imposing a torque against the gyroscope which, if not neutralized, would operate as an erecting torque acting in a direction other than that necessary to cause the gyroscope to develop the desired return precessional movement. The head 102 serves so to neutralize whatever torque the stators 43 and 44 might impose upon the gyroscope, since it is so mounted that its center of gravity is directly below the intersection of the gimbal axes when the gyroscope is in its normal position. It also does not exert any torque upon the gyroscope except when the gyro is displaced from its normal position and, just as in the case of the stator masses 43 and 44, it does exert torque upon the gyroscope whenever the gyroscope is displaced from the vertical, and of a magnitude which increases as the sine of the angle of such displacement. It is apparent therefore, that the torque exerted by each of the stator masses and that exerted by the head 102 are in opposite directions about the gimbal axes, and that they both vary correspondingly as the position of the gyroscope varies. Accordingly, by designing the head 102 to be of a certain weight as compared with that of the stator masses 43 and 44, and by arranging these parts with their respective centers of gravity in vertical alignment with and at suitable distances from the gimbal axes, the two torques are made to equilibrate each other and thus avoid disturbing the neutral equilibrium of the gyroscope.

I claim:

1. A gyro-vertical construction comprising a casing, a rotor journaled therein, spinning means therefor, a gimbal supporting said casing for oscillation about axes perpendicular to each other, and erecting means comprising a normally vertical pin revolubly mounted on said casing, rotating means therefor, and a pair of masses freely mounted independently of each other for oscillation under the influence of gravity about mutually perpendicular axes, each of said masses having a slot therein extending in a plane passing through the axis of oscillation thereof and said pin being loosely embraced within both of said slots, said masses being substantially in equilibrium when said pin is vertical but being displaced from position of equilibrium when said pin is removed from the vertical whereby they are pressed by gravity into drag-exerting relationship with the rotating pin and thereby generate an erecting torque acting on said casing.

2. A gyro-vertical construction comprising a casing, a rotor journaled therein, spinning means therefor, a gimbal supporting said casing for oscillation about axes perpendicular to each other, and erecting means comprising a normally vertical pin revolubly mounted on said casing, rotating means therefor, and a pair of masses freely mounted independently of each other for oscillation under the influence of gravity about mutually perpendicular axes, each of said masses having a slot therein extending in a plane passing through the axis of oscillation thereof and said pin being loosely embraced within both of said slots, said masses being substantially in unstable equilibrium when said pin is vertical, but being displaced from position of equilibrium when said pin is removed from the vertical whereby they are pressed by gravity against the rotating pin to develop friction therebetween and thereby generate an erecting torque acting on said casing.

3. A gyro-vertical construction comprising a casing, a rotor journaled therein, spinning means therefor, a gimbal supporting said casing for oscillation about axes perpendicular to each other, and erecting means comprising a normally vertical pin revolubly mounted on said casing, rotating means therefor, a pair of masses freely mounted independently of each other for oscillation under the influence of gravity about mutually perpendicular axes, each of said masses having a slot therein extending in a plane passing through the axis of oscillation thereof and said pin being loosely embraced within both of said slots, said masses being substantially in unstable equilibrium when said pin is removed from the vertical whereby they are pressed by gravity against the rotating pin to develop friction therebetween and thereby generate an erecting torque acting on said casing, and mass means mounted on said casing, substantially opposite said pin, and effective to equilibrate the gravitational torque exerted upon said gyroscope when said masses are displaced from their respective normal positions.

4. A gyro-vertical construction comprising a casing, means for supporting said casing for oscillation about mutually perpendicular axes, a rotor journaled in said casing, and erecting means comprising two masses freely mounted for oscillation under the influence of gravity independently of each other and about axes each of which is perpendicular to the vertical plane which includes one of said axes of said casing, both of said masses being substantially in equilibrium and crossing each other in spaced apart relation, a normally vertical pin revolubly mounted on said casing and extending through at least a portion of both of said masses to make frictional engagement therewith when said pin is displaced from the vertical, and means for rotating said pin, said masses being substantially in equilibrium when said pin is vertical but being displaced from position of equilibrium when said pin is removed from the vertical whereby they are pressed by gravity into drag-exerting relationship with the rotating pin and thereby generate an erecting torque acting on said casing.

5. A gyro-vertical construction comprising a casing, means for supporting said casing for oscillation about mutually perpendicular axes, a rotor journaled in said casing for rotation about a spinning axis perpendicular to at least one of said axes of said casing, and erecting means comprising two masses freely mounted for oscillation under the influence of gravity independent of each other and about axes each of which is perpendicular to the vertical plane which includes one of said axes of said casing, both of said masses being substantially in unstable equilibrium and crossing each other in spaced apart relation, a normally vertical pin revolubly mounted on said casing and extending through at least a portion of both of said masses to make frictional engagement therewith when said pin is displaced from the vertical, and means for rotating said pin, said masses being substantially in equilibrium when said pin is vertical but being displaced from position of equilibrium when said pin is removed from the vertical whereby they are pressed by gravity into drag-exerting relationship with the rotating pin and thereby generate an erecting torque acting on said casing.

6. A gyro-vertical construction comprising a casing, means for supporting said casing for oscillation about mutually perpendicular horizontal axes, a rotor journaled in said casing for rotation about a spinning axis perpendicular to both of said axes of said casing, and erecting means comprising two masses freely mounted for oscillation under the influence of gravity independently of each other and about axes each of which is perpendicular to the vertical plane which includes one of said axes of said casing, both of said masses being in unstable equilibrium and extending upwards from their respective supports to cross each other above said casing in spaced apart relation, each of said masses having a slot extending longitudinally thereof, a normally vertical pin revolubly mounted in said casing and extending upwards therefrom to be embraced in both of said slots and make frictional engagement with at least one of said masses when said pin is displaced from the vertical, and means for rotating said pin, said masses being substantially in equilibrium when said pin is vertical but being displaced from position of equilibrium when said pin is removed from the vertical whereby they are pressed by gravity into drag-exerting relationship with the rotating pin and thereby generate an erecting torque acting on said casing.

7. A gyro-vertical construction comprising a casing, means for supporting said casing for oscillation about mutually perpendicular horizontal axes, a rotor journaled in said casing for rotation about a spinning axis perpendicular to both of said axes of said casing, and erecting means comprising a pair of stators disposed in spaced apart relation and crossing each other in mutually perpendicular planes, each of said stators having a longitudinally extending slot therein each of said stators being freely mounted for oscillation under the influence of gravity about an axis normally coinciding with one of said axes of said casing and each of said stators extending partially around said casing in spaced relation thereto, and a rotor cooperatively associated with said stators and comprising a pin revolubly mounted in said casing and extending therefrom, said pin being embraced by both of said stators by extending into both of said slots, and means for rotating said pin, said stators being substantally in equilibrium when said pin is removed from the vertical whereby they are pressed by gravity into drag-exerting relationship with the rotating pin and thereby generate an erecting torque acting on said casing.

8. In a gyro-vertical construction, a gyroscope supported in substantially neutral equilibrium, gravity-actuated erecting means therefor comprising means providing a rotor carried by said gyroscope, and gravity-actuated means associated therewith and providing a stator therefor normally spaced therefrom but frictionally engaged thereby when said gyroscope becomes displaced from the vertical to develop friction therebetween and thereby generate an erecting torque acting on said gyroscope in a direction normal to the direction of its precedent displacement, and mass means carried by said gyroscope substantially opposite said rotor and effective to equilibrate the gravitational torque exerted upon said gyroscope when said stator is displaced from its normal position.

9. In a gyro-vertical construction, a casing, means supporting said casing for oscillation about mutually perpendicular axes, a rotor journaled within said casing for spinning about an axis perpendicular to both of said axes of said casing, means journaled in said casing providing a second rotor, and a pair of stators cooperatively associated with said second rotor to be selectively and frictionally engaged thereby upon displacement of said second rotor in any direction about said axes of said casing from predetermined position to develop friction therebetween and thereby generate an erecting torque acting upon said casing in a direction substantially perpendicular to its precedent displacement.

10. In a gyro-vertical construction, a casing, means supporting said casing for oscillation about mutually perpendicular axes, a rotor journaled within said casing for spinning about an axis perpendicular to both of said axes of said casing, means journaled in said casing providing a second rotor, and a pair of stators cooperatively associated with said second rotor to be selectively and frictionally engaged thereby upon displacement of said second rotor in any direction about said axes of said casing from predetermined position to develop friction therebetween and thereby generate an erecting torque acting upon said casing in a direction substantially perpendicular to its precedent displacement, each of said stators being mounted for oscillation about one of said axes of said casing and crossing the other adjacent the position of their engagement by said second rotor.

11. In a gyro-vertical construction, a casing, means supporting said casing for oscillation about mutually perpendicular axes, a rotor journaled within said casing for spinning about an axis perpendicular to both of said axes of said casing, means journaled in said casing providing a second rotor, and a pair of stators cooperatively associated with said second rotor to be selectively and frictionally engaged thereby upon displacement of said second rotor in any direction about said axes of said casing from predetermined position to develop friction therebetween and thereby generate an erecting torque acting upon said casing in a direction substantially perpendicular to its precedent displacement, each of said stators being mounted for oscillation about one of said axes of said casing and crossing the other adjacent the position of their engagement by said second rotor, each of said stators being arcuate about a center lying at the intersection of said axes of said casing whereby said second rotor remains in alignment with each of said stators while moving longitudinally thereof.

12. A gyro-vertical construction comprising a casing, a rotor journalled therein, spinning means therefor, a gimbal supporting said casing for oscillation about axes perpendicular to each other, and erecting means comprising a normally vertical pin revolubly mounted on said casing, rotating means therefor, and a pair of masses freely mounted independently of each other for oscillation under the influence of gravity about mutually perpendicular axes, each of said masses having a slot therein extending in a plane passing through the axis of oscillation thereof, and said pin being loosely embraced within both of said slots, said masses being substantially in equilibrium when said pin is vertical but being displaced from position of equilibrium when said pin is removed from the vertical whereby they are pressed by gravity into drag-exerting relationship with the rotating pin and thereby generate an erecting torque acting on said casing, said casing being supported with its center of gravity offset from said axes in a direction away from said pin and in equilibrating relationship with said masses.

13. In a gyro-vertical, a combination of means providing a support, a gyroscope, means mounting said gyroscope upon said support for freedom of movement about mutually perpendicular axes, and erecting means operable when said gyroscope's spinning axis becomes displaced from predetermined attitude for applying torque to said gyroscope in a direction at right angles to such displacement, said erecting means comprising torque-exerting means and a stator arranged in cooperative relation with said torque-exerting means to receive the reaction to torque exerted thereby, said stator being pivotally mounted on said support for movement with respect thereto only about the axis of its pivotal mounting thereon, whereby said reaction is transmitted positively to said support, both said stator and said mounting means and the entire load carried thereby being pivoted with their center of gravity offset from said mutually perpendicular axes but substantially in equilibrating relationship with respect to each other.

14. In a gyro-vertical construction, a casing, means supporting said casing for oscillation about a plurality of predetermined axes, a rotor journalled within said casing for spinning about an axis perpendicular to said predetermined axes, means journalled in said casing providing a second rotor, rotating means therefor, and a stator carried by said casing-supporting means and disposed in the path traversed by said second rotor upon displacement thereof in at least one direction about one of said predetermined axes, said stator extending through a material distance in a plane passing through said one of said predetermined axes whereby engagement between said second rotor and said stator is independent of the position of said second rotor with respect to any other of said predetermined axes, engagement between said second rotor and said stator developing friction therebetween and thereby generating an erecting torque acting upon said casing in a direction substantially parallel to said predetermined axis, the combined weight of said casing and all parts attached thereto which move angularly therewith about said predetermined axes, being such as to substantially equilibrate gravitational forces exerted directly against said casing by said stator.

THOMAS O. SUMMERS, JR.